United States Patent [19]

LaRocque et al.

[11] 4,192,587
[45] Mar. 11, 1980

[54] PROPORTIONAL FILL FLASH

[75] Inventors: Arthur G. LaRocque, Belmont; George D. Whiteside, Lexington; Bruce K. Johnson, Andover, all of Mass.

[73] Assignee: Polaroid Corporation, Cambridge, Mass.

[21] Appl. No.: 960,062

[22] Filed: Nov. 13, 1978

[51] Int. Cl.² .................... G03B 7/08; G03B 15/03
[52] U.S. Cl. .................................. 354/27; 354/34; 354/137; 354/139
[58] Field of Search ............... 354/27, 32, 33, 34, 354/60 F, 137, 139, 149

[56] References Cited

U.S. PATENT DOCUMENTS

| | | | |
|---|---|---|---|
| 3,478,660 | 11/1969 | Land | 354/139 |
| 3,628,437 | 12/1971 | Fahlenberg | 354/258 |
| 3,942,183 | 3/1976 | Whiteside | 354/29 |
| 3,977,014 | 8/1976 | Norris | 354/196 |
| 4,023,187 | 5/1977 | Shenk | 354/27 |
| 4,040,072 | 8/1977 | Johnson et al. | 354/173 |
| 4,064,519 | 12/1977 | Kee | 354/141 |
| 4,079,389 | 3/1978 | Hashimoto et al. | 354/33 |

OTHER PUBLICATIONS

U.S. application Ser. No. 898,546.
U.S. application Ser. No. 839,830.
U.S. application Ser. No. 840,802.
U.S. application Ser. No. 854,691.
U.S. application Ser. No. 919,084.
Pratical Photography, Oct. 1978, pp. 58-59, "Flash Fill-In".

*Primary Examiner*—Michael L. Gellner
*Attorney, Agent, or Firm*—Edward S. Roman

[57] ABSTRACT

A photographic camera control system is provided for varying the time at which a source of artificial illumination is energized subsequent to the commencement of a photographic exposure interval in accordance with variations in the ambient scene light intensity and the camera-to-subject range. The control system operates to energize the source of artificial illumination at later times and hence larger aperture values under conditions of insignificant ambient scene light intensity than under conditions of substantially higher ambient scene light intensity for identical camera-to-subject distances. The control system additionally operates to control the energization of the source of artificial illumination during a photographic exposure interval occurring under conditions of substantially high ambient scene light intensity so that a select portion of the optimum film exposure value may be directly attributable to the ambient scene light while the remaining portion of the optimum exposure value is directly attributable to the artificial scene light provided by the source of artificial illumination.

37 Claims, 5 Drawing Figures

PROPORTIONAL FILL FLASH

BACKGROUND OF THE INVENTION

1. Field of the Invention

This invention relates generally to an automatic flash fire control system for a photographic camera apparatus, and more particularly, to a system for automatically controlling the firing of a flash of artificial illumination under conditions of varying ambient scene light intensity and camera-to-subject distance range.

2. Description of the Prior Art

In the photographic art, exposure control systems embodying scanning shutter blade elements which operate to vary exposure aperture areas with time during the exposure interval are well-known as indicated by U.S. Pat. No. 3,942,183, entitled "Camera with Pivoting Blades", by G. Whiteside, issued Mar. 2, 1976 in common assignment herewith. Such scanning shutter blade mechanisms generally include a pair of counter reciprocating shutter blade elements each having a primary aperture that traverses the optical axis of the camera during the exposure interval. The primary apertures are shaped so that upon overlying one another during counter movement of the blades, there is defined an effective exposure aperture value which increases to a maximum value in a determinate period of time.

Exposure control is provided by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position.

Shutter mechanisms of the aforementioned type are often arranged to operate in synchronism with a source of artificial illumination such as an electronic flash or strobe. The shutter blade mechanism and strobe are generally arranged to operate in either a high ambient scene light intensity mode of operation where no artificial illumination is provided or a low ambient scene light intensity mode of operation where the strobe is fired to provide a source of artificial illumination. Under conditions of low ambient scene light intensity where the strobe is expected to be fired, the scanning shutter blade mechanism may be stopped at an aperture value corresponding to the camera-to-subject distance as determined by focusing the objective lens. Systems of the aforementioned type are generally referred to as "follow focus" systems and the maximum aperture to which the scanning shutter blade elements are allowed to open is controlled by the rangefinding or focusing system of the camera in a manner as is more fully disclosed in U.S. Pat. No. 3,977,014, entitled "Follow Focus Exposure Control System with Improved Uniform Trim Control", by P. Norris, issued Aug. 24, 1976 in common assignment herewith.

Such a system need not actually stop the opening shutter blade movement at a maximum effective exposure aperture as determined by the rangefinding or focusing system of the camera, but may instead, vary the time at which the strobe light is fired during the opening shutter blade movement as determined in correspondence with the rangefinding or focusing system of the camera. Since the duration of the strobe light is short in comparison to the time required for the shutter blade mechanism to scan from its scene light blocking position to its maximum exposure aperture defining position, the aperture defined by the shutter blade elements at the instant of strobe firing for practical purposes constitutes the effective aperture by which the exposure occurs. Such a system is more fully described in U.S. Pat. No. 3,478,660, entitled "Photographic Apparatus with Flash Exposure Control System", by E. Land, issued Nov. 18, 1969 in common assignment herewith. Range responsive flash firing systems of the aforementioned type can also be utilized on conjunction with sonar rangefinding devices as more fully described in U.S. patent application Ser. No. 898,546, entitled "Range Synchronized Flash Photographic Apparatus and Method for Achieving Optimum Exposure", filed Apr. 21, 1978 in common assignment herewith.

Exposure and artificial illumination control systems of the aforementioned type are generally intended to provide a source of artificial illumination only during the low ambient scene light intensity mode of operation. However, there may also be conditions during high ambient scene light intensity modes of operation wherein it becomes desirable to provide artificial illumination to fill in the photographic subject against a brightly back lit scene as is more fully disclosed in U.S. Pat. No. 4,023,187, entitled "Exposure Control System with Fill Flash Race Condition", by E. Shenk, issued May 10, 1977 in common assignment herewith. The aforementioned artificial illumination control system operates under conditions of low ambient scene light intensity to fire the strobe light at a predetermined time period subsequent to the initiation of the exposure interval and under conditions of high ambient scene light intensity to fire the strobe light as a consequence of the time integration of the scene light intensity incident to the photoresponsive element reaching a predetermined value. Although the aforementioned artificial illumination control system performs in a highly satisfactory manner, it nevertheless fails to provide a select ratio between that portion of the exposure which is directly attributable to the artificial scene illumination and the remaining portion of the exposure which is directly attributable to ambient scene light illumination over a determinate range of camera-to-subject distances.

Therefore, it is a primary object of this invention to provide a system for controlling the energization of a source of artificial illumination during a photographic exposure interval occurring under conditions of either low or high ambient scene light intensity, as a function of camera-to-subject range.

It is a further object of this invention to provide a system for energizing a source of artificial illumination at larger aperture values under conditions of insignificant or low ambient scene light intensity than under conditions of substantially higher ambient scene light intensity for the identical camera-to-subject distances.

It is an even further object of this invention to provide a system for controlling the energization of a source of artificial illumination during a photographic exposure interval occurring under conditions of substantially high ambient scene light intensity so that a select portion of the optimum film exposure value may be directly attributable to the ambient scene light while the remaining portion of the optimum exposure value may be directly attributable to the artificial scene light provided by the source of artificial illumination.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

A photographic control system is provided for controlling the energization of a source of artificial illumination during a photographic exposure interval occurring either under conditions of insignificant ambient scene light intensity or conditions of substantial ambient scene light intensity. The camera includes an exposure film plane together with means for detecting light prior to the commencement of the photographic exposure interval and for providing at least one select output signal condition responsive to the intensity of detected scene light being above a determinate level and another select output signal condition responsive to the intensity of detected scene light being below a determinate level. Means are also provided for automatically controlling a photographic exposure interval and comprise a shutter blade mechanism operable to provide progressively increasing aperture values during an exposure interval. Means are provided for detecting and integrating scene light in correspondence with scene light admitted by the blade mechanism to the film exposure plane at least during an exposure interval subsequent to the provision of the one select output signal condition in response to the detection of scene light being above the determinate level and for automatically closing the shutter blade mechanism to terminate the exposure interval. A range responsive timed signal commencing in correspondence with the initiation of the exposure interval and terminating at a subsequent time corresponding to the distance between the camera and the subject to be photographed is provided in response to the one select output signal condition. The duration of the timed signal may also be decreased by a constant factor in response to the other select output signal condition. Means responsive to the termination of the range responsive timed signal provide an output signal to initiate the energization of the source of artificial illumination.

The means for automatically controlling the exposure interval also operates in response to the provision of the one select output signal condition upon the detection of scene light above the determinate level to automatically close the shutter blade mechanism upon the detection and integration of a quantity of the admitted scene light corresponding to a select proportion of the optimum film exposure value. The camera further includes means responsive to the output signal for energizing the source of artificial illumination, subsequent to the provisions of the one select output signal condition upon the detection of the scene light above the determinate level, for controlling the scene light detecting and integrating means to discount the artificial scene light provided by the source of artificial illumination so that the select proportion of the optimum film exposure value is directly attributable to ambient scene light while the remaining portion of the optimum exposure value is directly attributable to artificial scene light provided by the source of artificial illumination.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
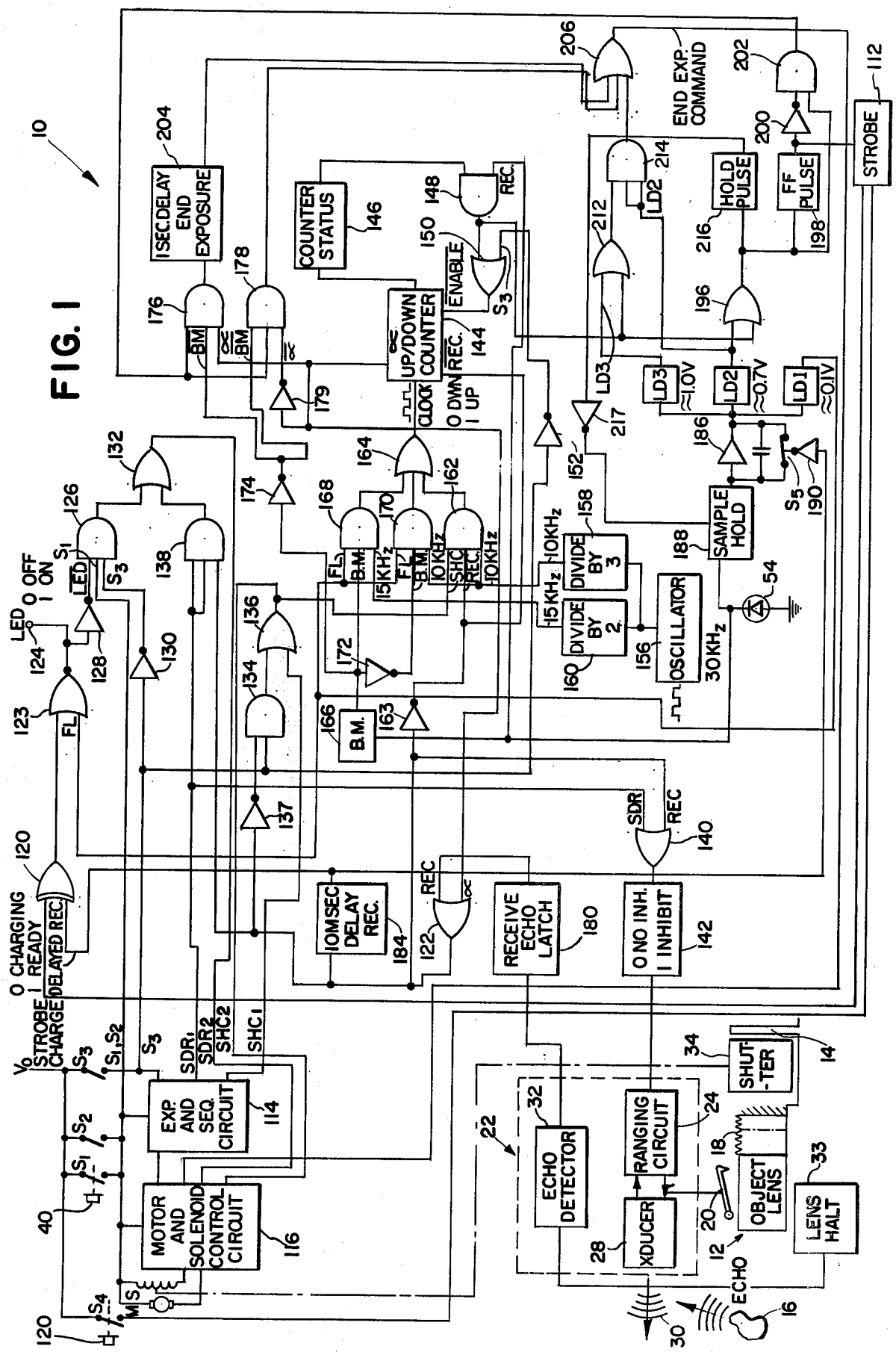
FIG. 1 is a schematic circuit diagram of the photographic control system and apparatus of this invention.

Referring now to FIG. 1 there is shown at 10, a schematic circuit diagram for the photographic camera apparatus of this invention. The camera apparatus 10 includes an objective lens arrangement or assembly, as shown in simplified fashion at 12, disposed for movement between a plurality of different focal positions. During each film exposure operation, the objective lens assembly 12 is displaced to one of its focal positions for focusing at a focal plane 14, image forming light rays from a respective photographic subject as shown at 16 located within a given range of distances from the camera apparatus. As is readily apparent, the lens assembly 12 is adapted at each of its plurality of focal positions to focus at the focal plane 14 of the camera, an image of a photographic subject located at a different distance from the camera within the given range of distances.

The lens assembly 12 is biased to move through its plurality of different focal positions by a tension spring 18 and may be held at an initial terminal position as shown in solid lines by a releasable latch 20. The spring 18 operates to bias the lens assembly 12 to move toward another terminal position as shown by the phantom lines. The lens assembly 12 while in its initial terminal position (solid lines), operates to focus image forming light rays from a photographic subject located at the closest possible distance to the camera within the aforementioned camera-to-subject distance range and while in its other terminal position (phantom lines) operates to focus image-forming light rays from a photographic subject located at the furthest possible distance from the camera within the aforementioned camera-to-subject distance range. The movement of the lens assembly 12 from its initial terminal position toward its other terminal position operates to progressively focus image-forming rays for corresponding subjects located at progressively increasing distances from the camera.

The photographic apparatus 10 is also provided with a sonic rangefinder as shown generally at 22 and which is more fully disclosed in copending U.S. patent applications Ser. No. 840,802 entitled "Ultra-sonic Ranging System For a Camera" by J. Muggli and Ser. No. 919,084 entitled "Sonar Controlled Lens Focus Apparatus" by B. Johnson, et al filed June 26, 1978 in common assignment herewith. The sonic rangefinder 22 includes a ranging circuit 24 which may be actuated in a manner to be herein described to issue a transmit commence signal to a sonic transducer 28 so as to cause the transmission of a sonar ranging signal comprising a burst of sonic energy as shown at 30. The transducer 28 thereafter operates to detect an echo signal reflected from the photographic subject 16 at an elapsed time interval subsequent to the transmission of the sonar ranging signal. An echo detector 32 then provides a signal indicative of this elapsed time period which corresponds directly to the distance between the camera and the subject 16 to be photographed. Thus, the sonic rangefinder 22 provides an indication of an elapsed time period which corresponds directly to the distance between the camera and the subject to be photographed for reasons which will become more apparent in the following paragraphs.

Intermediate the objective lens arrangement 12 in the focal plane 14, there is provided a shutter mechanism that is shown generally at 34 comprising two overlapping shutter blade elements 36 and 38 (see FIGS. 2-4) of the so-called scanning type which will be subsequently described in greater detail herein. The photographic camera apparatus is also provided with a photographic cycle initiating button as shown at 40 in FIG. 1 wherein the depression of the button 40 operates to commence an exposure interval by ultimately effecting the release of the shutter blade elements 36 and 38 in a manner to be subsequently described herein.

Figure 2:
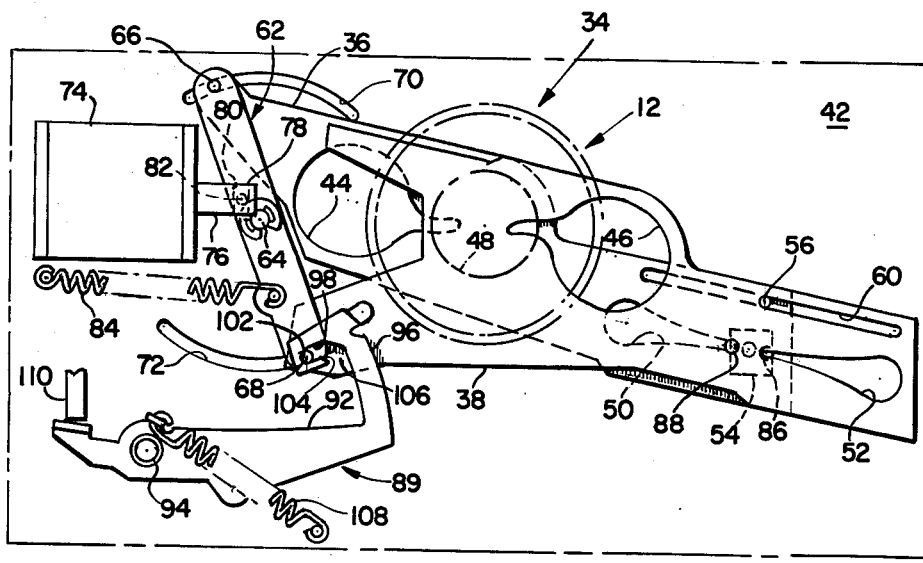
FIG. 2 is a front elevational view showing portions of the shutter blade mechanism of FIG. 1.
Figure 3:
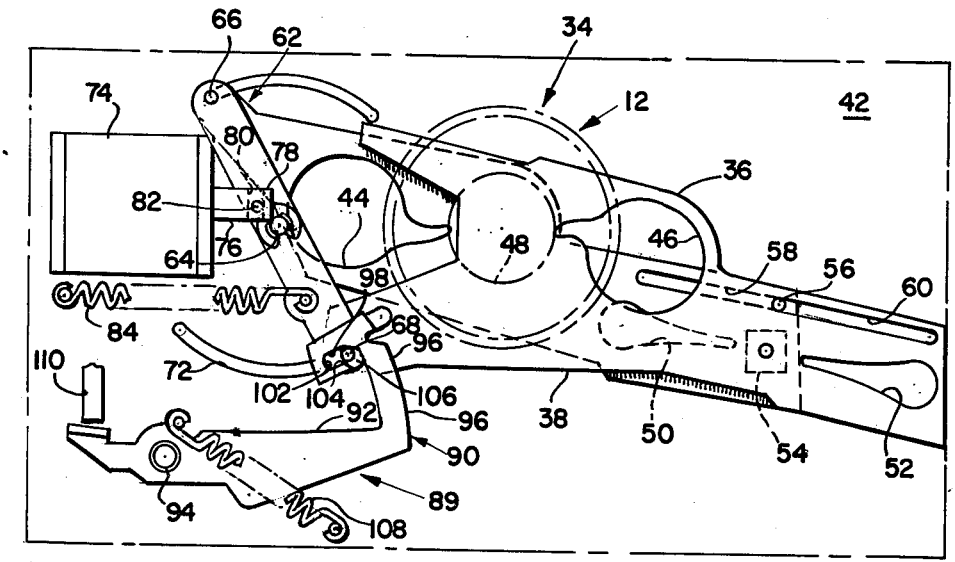
FIG. 3 is a front elevation view showing portions of the shutter blade mechanism of FIG. 2 at a different position.
Figure 4:
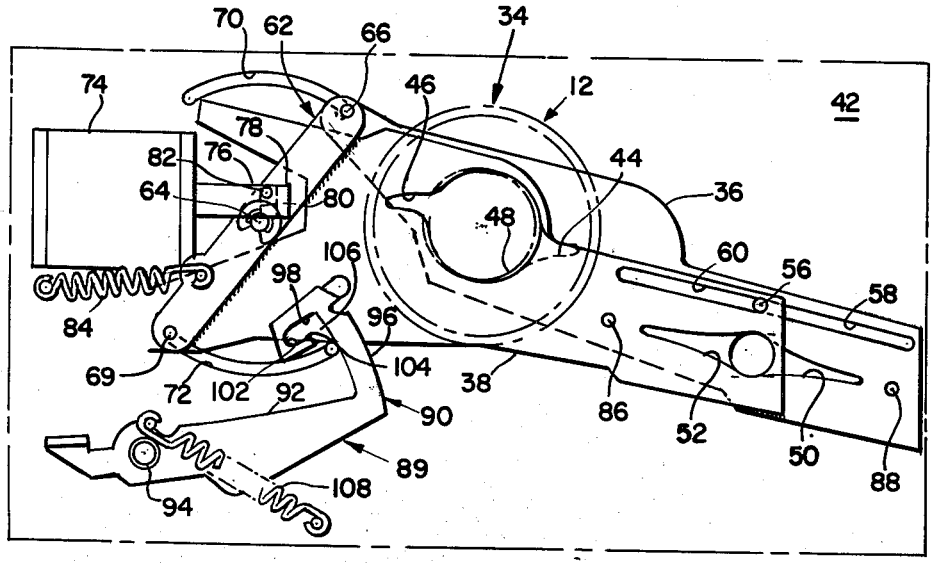
FIG. 4 is a front elevational view showing portions of the shutter blade mechanism of FIG. 2 in still another position.

Referring now to FIGS. 2–4, it can be seen that a pair of scene light admitting primary apertures 44 and 46 are provided respectively in the blade elements 36 and 38 to collectively define a progressive variation of effective aperture openings in accordance with simultaneous longitudinal and lateral displacement of one blade element with respect to the other blade element in a manner as is fully described in U.S. Pat. No. 3,942,183 entitled "Camera with Pivoting Blades" by George D. Whiteside, issued Mar. 2, 1976 and assigned in common herewith. The apertures 44 and 46 are selectively shaped so as to overlap a light entering exposure opening 48 in a baseblock casting 42 thereby defining a gradually varying effective aperture size as a function of the position of the blade elements 36 and 38.

Each of the blades 36 and 38 may additionally be configured to have corresponding photocell sweep secondary apertures shown respectively at 50 and 52. Secondary apertures 50 and 52 may be configured in correspondance with the shapes of scene light admitting primary apertures 44 and 46. As is readily apparent, the secondary apertures 50 and 52 also move in correspondence with the primary apertures 44 and 46 to define a small secondary aperture for admitting the passage of scene light to a photoresponsive element 54.

Projecting from the baseblock casting 42 at a location spaced laterally apart from the light entering exposure opening 48, is a pivot pin or stud 56 which pivotally and translatably engages elongated slots 58 and 60 formed in respective shutter blade elements 36 and 38. Pin 56 may be integrally formed with the baseblock casting 42 and blade elements 36 and 38 may be retained in engaging relation with respect to the pin 56 by any suitable means such as peening over the outside end of the pin 56.

The opposite ends of the blade element 36 and 38 respectively include extended portions which pivotally connect to a walking beam 62. The walking beam 62, in turn, is disposed for rotation relative to the baseblock casting 42 by pivotal connection to a projecting pivot pin or stud 64 which may be integrally formed with the baseblock casting 42 at a location spaced laterally apart from the light entering exposure opening 48. The walking beam 62 may be pivotally retained with respect to the pin 64 by conventional means such as an E-ring (not shown). In the preferred mode, the walking beam 62 is pivotally connected at its distal ends to the shutter blade elements 36 and 38 by respective pin members 66 and 68 which extend laterally outward from the walking beam 62. Pin members 66 and 68 are preferably circular in cross-section and extend through respective openings in respective blade elements 36 and 38 so as to slidably engage respective arcuate tracks 70 and 72 which may be integrally formed within the baseblock casting 42. The arcuate tracks 70 and 72 operate to inhibit disengagement of the blade elements 36 and 38 from their respective pin members 66 and 68 during operation of the exposure control system. Thus, the walking beam 62 and shutter blade elements 36 and 38 collectively define a blade mechanism together with a means for mounting the blade mechanism for displacement including pivot pins 58 and 64.

Drive means are provided for displacing the blade mechanism 34 and include a tractive electromagnetic device in the form of a solenoid 74 employed to displace the shutter blades 36 and 38 with respect to each other and the baseblock casting 42. The solenoid 74 includes an internally disposed cylindrical plunger unit 76 which retracts inwardly into the body of the solenoid upon energization of the solenoid winding. The solenoid plunger 76 includes an end cap 78 at the outside end thereof together with a verticle slot or groove 80 within the end cap 78 for loosely engaging a pin 82 extending outwardly from the walking beam 62. In this manner, the solenoid plunger 76 is affixed to the walking beam 62 so that longitudinal displacement of the plunger 76 will operate to rotate the walking beam around the pivot pin 64 so as to appropriately displace the shutter blades 36 and 38. The drive means may additionally include a helical tension spring 84 so as to continuously urge the blade elements 36 and 38 into positions defining their largest effective aperture over the light entry exposure opening 48. As will be readily understood, in some shutter blade arrangements, it may be preferable to use a compression spring in place of the tension spring 84 in a manner as is shown in U.S. Pat. No. 4,040,072 entitled "Shutter Latch Arrangement Releasable Through Shutter Blade Actuation and Resettable Through Film Advancement", by B. Johnson, issued Aug. 2, 1977 in common assignment herewith. Thus, with the spring connection herein described, the exposure control system of this invention is biased to continuously urge the shutter blade elements 36 and 38 into an open orientation.

The shutter blade elements 36 and 38 are respectively provided with a third set of apertures 86 and 88 as is more fully described in U.S. pat. application Ser. No. 854,691 entitled "An Exposure Control System for Use in a Photographic Camera", by B. Johnson, filed Nov. 25, 1977 filed in common assignment herewith. The third pair of apertures 86 and 88 overlap each other to provide an aperture of predetermined value that is aligned with the photoresponsive element 54 so as to permit passage of light from the scene to impinge upon the photoresponsive element 54 when the shutter blades 36 and 38 are moved to the positions as shown in FIG.

3 in a manner to be more fully described in the following paragraphs.

In order that the shutter blade elements 36 and 38 may be maintained in their scene light blocking arrangement without requiring the continuous energization of the solenoid 74, there is provided a latch mechanism as shown generally at 89 comprising a latch member 90 having an elongated main body portion 92 disposed for rotation about a pivot pin or shaft 94 integrally molded with respect to the base block casting 94. The main body portion 92 includes an integral arm portion 96 extending outwardly therefrom into overlapping relation therewith to ultimately define an integral hook portion 98. Hook portion 98 is adapted for releasable engagement with a portion of the pin member 68 which extends laterally forward from the side of the walking beam 62.

More specifically, hook portion 98 defines a first edge surface 102 which engages pin member 68 so as to inhibit clockwise rotation of walking beam 62 about pin 64. In addition, hook portion 98 defines a second edge surface 104 which engages the bottom of pin member 68 to inhibit counterclockwise rotation of latch member 90 about its pivot pin 94. A latch release slot is shown generally at 106. The manner in which the walking beam 62 may be released from the hook portion 98 is more fully described in U.S. Pat. No. 4,040,072, supra.

Latch member 90 is resiliently biased for yieldable clockwise rotation about its pivot pin 94 by a tension spring 108, one end of which engages the latch member 90 and the other end of which is fixedly connected with respect to the base block casting 42. A return actuator as shown generally at 110 is provided for releasing the latch member 90 against the yieldable bias of tension spring 108 in a manner as is more fully described in U.S. Pat. No. 4,040,072, supra.

The camera is preferably provided with an integral electronic flash or strobe as shown schematically in FIG. 1 at 112. The strobe charging and triggering circuitry may be of a type well known in the art as is more fully disclosed in U.S. Pat. No. 4,064,519, entitled "Regulated Strobe for Camera with Sixth Flash Inhibit" issued Dec. 20, 1977 in common assignment herewith. The strobe 112 preferably derives charging power from a battery that is insertable within the camera in correspondence with the film pack or cassette in a manner that is well known in the art for Polaroid SX-70-type film cassettes and cameras.

The aforementioned film cassette battery is also preferably utilized to power the circuitry of FIG. 1 in its entirety by way of three switches $S_1$, $S_2$, and $S_3$ in a manner as is more fully described in U.S. Pat. No. 4,040,072, supra. The camera of this invention is also provided with an exposure and sequencing circuit 114 and a motor and solenoid control circuit 116 which operate in a manner also more fully described in U.S. Pat. No. 4,040,072, supra. As is readily apparent, the motor and solenoid control circuit 116 operates to control the energizing current delivered to the solenoid 74 and to a motor 118. The film units intended for use with the camera of this invention are preferably of the self-developing type and the motor 118 is provided to effect the advancement and processing of the self-developing film units in a well-known manner.

Figure 5:
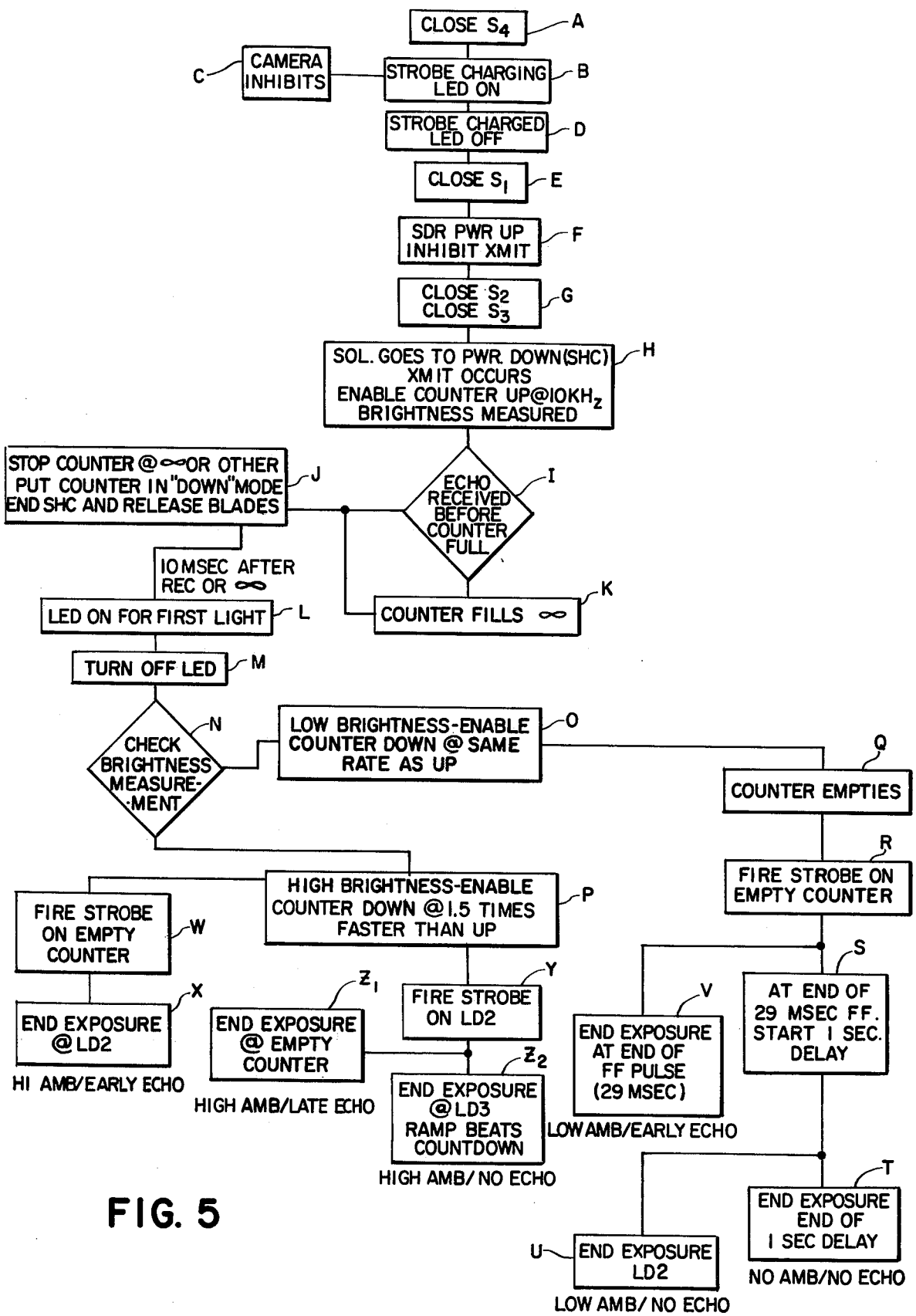
FIG. 5 is a flow chart showing an automatic sequence of operations for the exposure control apparatus of FIG. 1.

Referring now to FIG. 5 in conjunction with FIG. 1, there is shown a sequence of operations through which the camera is automatically guided to provide artificial illumination by way of the strobe 112 under varying conditions of ambient scene light intensity and camera-to-subject distance range. In order for a photographer to commence a photographic exposure cycle, he must first energize the strobe 112 by manually actuating a strobe charge button 120 (Block A) so as to close switch $S_4$ and effect the charging of the strobe 112 in a well-known manner. During the time that the strobe 112 is charging (Block B), a logic 0 signal level is provided by the strobe 112 to one input terminal, Strobe Charge, of an exclusive OR gate 120. During the strobe charge time, the other input terminal, Delayed Rec. to the exclusive OR gate 120 is also maintained at a logic 0 signal level for reasons which will become more apparent from the following discussion. Thus, the exclusive OR gate 120 provides a logic 0 output signal level which is directed to a NOR gate 123. The other input terminal FL to the NOR gate 123 is also maintained at a logic 0 signal level for reasons which will also become more apparent from the following discussion. Therefore, the output from the NOR gate 123 is switched at a logic 1 signal level so as to energize an LED 124 (Block B) during the time required for the strobe 112 to become fully charged.

The light from the LED 124 is made visible to the photographer and thus provides him with a visual indication that the strobe 112 is in a state of charging and that the photographic cycle initiating button 40 should not be depressed. However, if the photographer should try to actuate the photographic cycle initiating button 40 prematurely prior to the strobe 112 reaching its fully charged condition while the LED 124 is energized, there may be provided a system for inhibiting the operation of the camera in a manner as is more fully described in U.S. Pat. No. 4,064,519, supra as indicated in Block C, FIG. 5.

When the strobe 112 is fully charged in readiness for a photographic exposure cycle, there is provided a logic 1 level output signal to the exclusive OR gate 120 thereby switching the output from the exclusive OR gate 120 from a logic 0 signal level to a logic 1 signal level. This, in turn, switches the output from the NOR gate 123 from a logic 1 signal level to a logic 0 signal level thereby turning off the LED 124 (Block D).

Once the LED 124 is deenergized, a photographer may initiate a photographic exposure cycle by manually actuating the button 40 so as to close the switch $S_1$ (Block E) in the manner as fully described in U.S. Pat. No. 4,040,072, supra. Closure of the switch $S_1$ energizes the exposure sequencing circuit 114 while simultaneously providing a logic 1 input signal level to one input terminal $S_1$ of an AND gate 126. The AND gate 126 has two other input terminals which at the instant of $S_1$ closing are also at logic 1 signal levels. One of the other input signals to the AND gate 126 at input terminal LED is derived from the LED 124 by way of an inverter 128 while the other input signal to the AND gate 126 at input terminal $S_3$ is derived from the open switch $S_3$ by way of another inverter 130. Thus, the output from the AND gate 126 is switched to a logic 1 signal level upon closure of the switch $S_1$. The output from the AND gate 126, in turn, is directed to an OR gate 132 so as to switch the output from the OR gate to a logic 1 signal level thereby providing a solenoid drive signal by way of a line $SDR_2$ to the motor and solenoid control circuit 116. The motor and solenoid control circuit 116, in turn, energizes the solenoid 74 (Block F) to retract the plunger 76 inwardly and rotate the walking beam 62 in a counterclockwise direction from its position as shown in FIG. 2 to its position as shown in FIG. 3.

Referring now to FIG. 3, it can be seen that the walking beam 62 has been rotated in a counterclockwise direction so as to displace the pin 68 out of engagement with the latching surfaces 104 and 102 and into alignment with the latch release slot 106. The latch member 90 is thereafter rotated in a counterclockwise direction about the pivot pin 94 by the actuator member 110 against the biasing force of tension spring 108 in a manner as is more fully described in U.S. Pat. No. 4,040,072, supra. In this manner, the latch member 90 is rotated in a counterclockwise direction from its position as shown in FIG. 3 to its position as shown in FIG. 4 so as to allow the subsequent rotation of the walking beam 62 in a clockwise direction toward its maximum aperture defining position. Movement of the actuator member 110 in the direction effecting release of the latch mechanism 89 also operates to simultaneously effect the closing of the switches $S_2$ and $S_3$ (Block G) in a manner as is again more fully described in U.S. Pat. No. 4,040,072 supra.

Closure of the switch $S_3$, in turn, operates to power down the solenoid 78 from the initial high current energization condition required to retract the plunger 76 to a low current energization condition (Block H) required to hold the plunger in its retracted position as shown in FIG. 3. The powering down of the solenoid 74 to a holding current mode (SHC) is accomplished as follows. Closure of the switch $S_3$ provides a logic 1 signal level to the inverter 130 which, in turn, provides a logic 0 signal level to the input terminal $S_3$ of the AND gate 126. This, in turn, switches the output of the AND gate 126 from a logic 1 signal level to a logic 0 signal level thereby switching the output from the OR gate 132 from a logic 1 signal level to a logic 0 signal level so as to eliminate the solenoid drive signal along the line $SDR_2$ to the motor solenoid control circuit 116. At the same time, a solenoid hold signal (SHC) is provided by the logic 1 signal level from the closed switch $S_3$ which operates to switch an AND gate 134 from a logic 0 output signal level to a logic 1 output signal level. The other input signal level to the AND gate 134 is derived from an inverter 137 and is already at a logic 1 signal level for reasons which will become apparent from the following discussion. Thus, the output logic 1 signal level from the AND gate 134 operates to switch an OR gate 136 to provide a logic 1 output signal level therefrom to the motor and solenoid control circuit 116 along a line $SHC_2$.

Powering down the solenoid 74 in the aforementioned manner from a solenoid drive current (SDR) to a solenoid holding current (SHC) also operates to actuate the sonar rangefinder 22 to transmit a sonar ranging signal 30 (Block H) in the following manner. Upon the initial closure of the switch $S_1$, the exposure and sequencing circuit 114 provided a logic 1 solenoid drive signal level along a line $SDR_1$ to an AND gate 138. Whereas the other input signal to the AND gate 138 was already at a logic 0 signal level for reasons which will become apparent from the following discussion, the output signal from the AND gate 138 remained at a logic 0 signal level. The logic 1 solenoid drive signal level from the expsoure and sequencing circuit 114 along $SDR_1$ was also directed to an input terminal, SDR, of an OR gate 140. Thus, the output from the OR gate 140 during the high current solenoid drive mode (SDR) subsequent to the closure of the switch $S_1$ and prior to the closure of the switches $S_2$ and $S_3$ operated to provide a logic 1 signal level output to a sonar inhibiting circuit 142 thereby inhibiting transmission of a sonar ranging signal by the sonic rangefinder 22 (Block F).

Closure of the switches $S_2$ and $S_3$ in the aforementioned manner powers down the solenoid 74 into its holding current mode (SHC) of operation and changes the logic 1 output signal level from the exposure and sequencing circuit 144 to the input terminal SDR of the OR gate 140 to a logic 0 output signal level thereby changing the output from the OR gate 140 to a logic 0 signal level so as to remove the inhibit imposed on the sonar rangefinding circuit 22 by the inhibit circuit 142. In this manner, the sonar rangefinding circuit 22 is actuated to issue a transmit commence signal to the sonic transducer 14 (Block H).

The latch 20 is withdrawn in response to the transmit command issued by the ranging circuit 24 thereby releasing the lens assembly 12 to move from its close-up focus position (solid lines) toward its far distance focus position (phantom lines). A lens halting mechanism as shown generally at 35 operates in response to the output of the echo detector 32 which detects the echo signal reflected from the photographic subject 16 at an elapsed time interval subsequent to the transmission of the sonar ranging signal (Block I). The latch mechanism 33 thereby operates to interrupt the movement of the lens assembly 12 subsequent to its initial displacement from its close-up focus position at an elapsed time interval which correlates to the elapsed time interval between transmission of the sonar ranging signal and receipt of the echo from the photographic subject. The photographic subject will thus preferably be focused in the elapsed time interval (real time) between the transmission of the sonar ranging signal and the receipt of the echo by the sonic rangefinder 22. As will be readily understood, the dynamic characteristic of the lens assembly 12 drive, which in the aforementioned example constitutes the spring 18, operates to move the lens assembly 12 through its plurality of focal positions at a rate such that the lens assembly 20 reaches each one of its plurality of focal positions at substantially the same time at which an echo from the sonar ranging signal would be received by the echo detector 32 subsequent to being reflected from a subject located at the camera-to-subject distance directly corresponding to that one focal position.

Closure of the switches $S_2$ and $S_3$ in the aforementioned manner to power down the solenoid 74 to its holding current mode (SHC) also operates to enable an up-down counter as shown generally at 144 (Block H) in the following manner. As is readily apparent, the initial condition of the counter 144 is empty and a counter status circuit 146 senses the terminal count of the counter 144 and provides a logic 1 output signal as an indication that the up-down counter 144 is empty. The output from the counter status circuit 146 is directed to an AND gate 148 which, in turn, provides a logic 0 output signal level since the other input terminal REC thereto is at a logic 0 signal level prior to receipt of the ranging signal by the echo detector 32. The logic 0 output signal level from the AND gate 148, in turn, is directed to an OR gate 150. The other input terminal $S_3$ to the OR gate 150 is derived from the switch $S_3$ by way of an inverter 152 and thus assumes a logic 1 signal level prior to the closure of the switch $S_3$ and is thereafter changed to a logic 0 input signal level upon the closure of the switch $S_3$. The up-down counter 144 is disabled by a logic 1 input signal level from the OR gate 150 prior to the closure of the switch S₃ while the solenoid 74 is in its current driving mode (SDR) and is therafter enabled to provide a count by a logic 0 output signal level from the OR gate 150 upon the closure of the switch S₃.

The count is provided to the up-down counter 144 by an oscillator 156 which provides a 30 KHz output clock pulse. The 30 KHz output clock pulse from the oscillator 156 is directed simultaneously to a first divider circuit 158 wherein the 30 KHz clock pulse is divided by 3 to provide an output clock pulse of 10 KHz and another divider circuit 160 wherein the 30 KHz clock pulse is divided by 2 to provide a 15 KHz output clock pulse for reasons which will become apparent from the following discussion. The 10 KHz clock pulse is directed to an input terminal, 10 KHz, of an AND gate 162 whereupon the output from the AND gate is directed to an OR gate 164. The AND gate 162 receives at another input terminal $\overline{REC}$ a logic 1 signal level from an inverter 163 prior to the receipt of the ranging signal by the echo detector 32 as will be more fully described in the following discussion. The remaining input terminal SHC to the AND gate 162 receives an input signal from the switch S₃ by way of the AND gate 134 and the OR gate 136. Thus, closure of the switch S₃ provides a logic 1 signal level to the input terminal SHC of AND gate 162 so as to enable the AND gate 162 to gate the 10 KHz clock pulse to the OR gate 164. The OR gate 164, in turn, gates the 10 KHz clock pulse into the up-down counter 144. The aforementioned logic 1 signal level from the inverter 163 is also directed to an up-down terminal of the counter 144 and operates to set the mode of the counter 144 to count "up" prior to receipt of the ranging signal by the echo detector 32. In this manner, the up-down counter 144 is actuated to count up the 10 KHz clock pulse at the instant that the sonar ranging signal is transmitted by the sonar rangefinding circuit 122.

As is readily apparent, movement of the shutter blade mechanism 34 from its position as shown in FIG. 2 to its position as shown in FIG. 3 also operated to move the third pair of apertures 86 and 88 into overlapping relationship with respect to each other so as to admit scene light to the photoresponsive element 54. The photoresponsive element 54 responds to the incident scene light and provides an output signal to a brightness measurement circuit 166 (Block H). The brightness measurement circuit 166, in turn, provides a logic 0 output signal level if the intensity of the detected scene light is below a determinate level and a logic 1 output signal level if the intensity of detected scene light is above the determinate level. The determinate level above which the brightness measuring circuit 166 provides a logic 1 signal level and below which it provides a logic 0 signal level is preferably established to be 10 Cd/ft².

The output signal from the brightness measurement circuit 166 is directed to an input terminal BM of a first AND gate 168 which receives a logic 1 signal level upon the measurement of a scene light intensity above 10 Cd/ft² and an input terminal $\overline{BM}$ of a second AND gate 170 which receives a logic 1 level input signal by way of an inverter 172 upon the measurement of a scene light intensity below 10 Cd/ft². The output from the brightness measurement circuit 166 is also directed by way of another inverter 174 to an input terminal $\overline{BM}$ of a first AND gate 176 and another input terminal $\overline{BM}$ of a second AND gate 178. The AND gates 176 and 178 thus receive a logic 1 signal level at their respective input terminals by way of the inverter 174 upon the measurement of a scene light intensity below 10 Cd/ft².

Receipt of the echo signal by the transducer 28 (Block I) signals the echo detector 32 to provide an output signal to trigger a receive echo latch circuit as shown generally at 180. The output from the receive echo latch circuit 180, in turn, is directed to an OR gate 122 and switches the output signal from the OR gate 122 from a logic 0 signal level to a logic 1 signal level upon the receipt of the echo signal by the sonar ranging circuit 22. The logic 1 output signal level from the OR gate 122, in turn, is inverted by the inverter 163 to a logic 0 signal level which in turn gates the AND gate 162 off so as to stop the 10 KHz clock pulse from being counted up by the up-down counter 144 (Block J). The change in the output signal from the inverter 163 from a logic 1 output signal level to a logic 0 output signal level also operates to change the counter 144 from an "up" mode of counting to a "down" mode of counting (Block J).

The output signal from the OR gate 122 is also directed to one input terminal of the AND gate 138 to ready the AND gate 138 to provide a logic 1 output signal level in response to a logic 1 input signal level being provided by the exposure and sequencing circuit 114 along the line SDR₁. The logic 1 output signal level from the OR gate 122, in turn, is inverted by the inverter 137 to a logic 0 input signal level to the AND gate 134. The output from the AND gate 134 is thus changed to a logic 0 signal level, in turn, switching the output signal from the OR gate 136 to a logic 0 output signal level. The output from the OR gate 136 is thereafter directed by way of a line SHC₂ to the motor and solenoid control circuit 116 to de-energize the solenoid 74 and commence the exposure cycle (Block J).

The output signal from the OR gate 122 is also delayed, preferably by 10 milliseconds, through a delay circuit 184. The delayed signal is thereafter directed to the exclusive OR gate 120 to switch the output therefrom from a logic 1 signal level to a logic 0 signal level. The logic 0 output signal level from the exclusive OR gate 120 is thereafter directed to the NOR gate 123 to switch its output signal level from a logic 0 to a logic 1. The logic 1 output signal level from the NOR gate 123, in turn, energizes the LED 124 for reasons which will become apparent from the following discussion.

In the event that the subject should be located at an infinite distance from the camera which by way of example may be considered to be any distance greater than 30 ft., then the counter 144 will fill and provide a logic 1 output signal level at terminal α (Block K). This logic 1 output signal level from the counter 144, in turn, will be directed to an input terminal α of the AND gate 176 and to another input terminal $\bar{a}$ of the AND gate 178 by way of an inverter 179 for reasons which will become more apparent from the following discussion. The logic 1 output signal level from the filled counter 144 is also directed to another input terminal α of the OR gate 122 so as to switch the output from the OR gate 122 from a logic 0 signal level to a logic 1 signal level in the manner previously described upon receipt of the ranging echo.

As is now readily apparent, either receipt of the echo by the rangefinder 22 or the filling of the counter 144 when subjects are located at infinity operates to terminate the "up" count by the counter 144 while simultaneously de-energizing the solenoid 74 to release the shutter blade elements 36 and 38 to commence an exposure cycle. The LED 124 is thereafter energized to provide light 10 milliseconds after the shutter blade elements are released. The de-energization of the solenoid 74 results in clockwise rotation of the walking beam 62 under the biasing force of tension spring 84 from its scene light blocking position as shown in FIG. 3 to its scene light admitting position as shown in FIG. 4. As is readily apparent, the walking beam 62 must be moved through a limited degree of rotation before the primary scene light admitting apertures 44 and 46 overlap to admit the first scene light to the focal plane 14. Whereas the photocell sweep secondary apertures 50 and 52 move in correspondence with the primary apertures 44 and 46, the walking beam 62 must be rotated through a limited number of degrees before the first scene light is also admitted by the secondary apertures 50 and 52 to the photoresponsive element 54.

The LED 124 may be aligned co-axially with respect to the photoresponsive element 54 on the opposite side of the shutter blade elements 36 and 38 so as to provide illumination detectable by the photoresponsive element 54 when the secondary apertures 50 and 52 overlap without interferring with the transmission of scene light through the apertures 50 and 52. Alternatively, separate apertures may be provided to admit the light from the LED 124 to the photoresponsive element 54 in synchronism with the commencement of the exposure interval as further described in U.S. Pat. No. 3,628,437, entitled "Photographic Camera," issued Dec. 21, 1971. As previously described, the LED 124 is energized to provide illumination 10 milliseconds subsequent to the release of the shutter blade elements 36 and 38 (Block L). The 10 millisecond delay in energizing the LED 124 assures that the light from the LED will not be admitted to the photoresponsive element 54 by the third pair of apertures 86 and 88. Thus, regardless of the actual ambient scene light conditions, an indication may be provided as to the first instant at which the primary apertures 44 and 46 overlap to admit scene light to the focal plane 14 by way of the light from the LED 122 being admitted to the photoresponsive element 54 at the instant that the secondary apertures 50 and 52 first overlap.

The photoresponsive element 54 thus responds to the light emitted from the LED 122 at the instant that the secondary apertures 50 and 52 first overlap to provide an output signal to an integrator circuit 186 by way of a sample and hold circuit 188. The sample and hold circuit 188 samples the output signal from the light responsive element 54 in a well-known manner and thereafter directs the sampled output signal to the integrator circuit 186 unless signaled to hold in a manner to be subsequently described in greater detail herein. The integrator circuit 186 is turned on in coincidence with the LED 124 by way of a switch $S_5$ which opens in response to the receipt of a logic 0 signal level provided by way of an inverter 190 from the 10 millisecond delay circuit 184. The output from the integrator 186, in turn, is directed to three level detector circuits LD1, LD2 and LD3. The output signal from the level detector LD1 switches from a logic 0 output signal level to a logic 1 output signal level upon the detection of the first light provided by the LED 124. By way of example, the level detector LD1 may be set to trigger upon an input voltage of 0.1 volts.

The logic 1 output signal level form the level detector LD1, in turn, is directed to the NOR gate 123 so as to switch the output therefrom from a logic 1 output signal level to a logic 0 output signal level thereby turning off the LED 124 (Block M).

The output from the level detector LD1 is also directed to the AND gates 168 and 170 to enable one of the AND gates to gate a clock pulse into the counter 144 by way of the OR gate 164 as a result of the previous scene brightness measurement (Block N). As previously discussed, the counter 144 is in a "down" mode and will count down the respective clock pulse provided thereto by the OR gate 164. As is now readily apparent, under low ambient scene light conditions where the scene light intensity is less than 10 $Cd/ft^2$, AND gate 170 will be enabled to gate the 10 KHz clock pulse to the counter 144 and the counter 144 will count down at the same rate at which it previously counted up (Block O). Conversely, under high ambient scene light intensity conditions (above 10 $Cd/ft^2$), the AND gate 168 will be enabled to gate the 15 $KH_Z$ clock pulse to the counter 144 and will count down at a rate of 1.5 times faster than the rate it previously counted up (Block P).

Under conditions of low ambient scene light intensity of less than 10 $Cd/ft^2$, the counter 144 will empty prior to the output from the light integrator 186 triggering the level detector LD2 (Block Q). When the counter 144 empties, the counter status circuit 146 will switch from a logic 0 output signal level to a logic 1 output signal level thereby providing a logic 1 input signal level to the AND gate 148. The other input signal level at terminal REC to the AND gate 148 is already at a logic 1 signal level by virtue of receipt of the echo signal from the rangefinder 22. Thus, the output signal from the AND gate 148 switches to a logic 1 signal level so as to switch the OR gate 150 to provide a logic 1 output signal thereby disabling the counter 144. The logic 1 output signal from the AND gate 148 is also directed to an OR gate 196 which, in turn, switches to a logic 1 output signal level to trigger a flash fire pulse circuit 198. The flash fire pulse circuit 198, in turn, provides a 29 millisecond flash fire pulse to trigger the strobe 112 and fire its associated flash tube in a well-known manner (Block R).

Thus, the counter 144 by counting down the 10 KHz input clock pulse provides a range responsive timed signal commencing in correspondence with the initiation of the exposure interval and terminating at a subsequent time corresponding to the distance between the camera and the subject to be photographed. Means comprising the counter status circuit 146, the AND gate 148, the OR gate 196 and the flash fire pulse circuit 198 cooperatively respond to the termination of this range responsive timed signal (counter empties) to initiate the energization of the source of artificial illumination (strobe).

The output signal from the flash fire pulse circuit 198 is inverted by an inverter 200 and directed to one input of an AND gate 202. The input signal to the flash fire circuit 198 is directed to the other input terminal of the AND gate 202. Thus, the AND gate 202 provides a logic 0 output signal level during the 29 millisecond duration of the flash fire pulse from the flash fire pulse circuit 198. Upon termination of the 29 millisecond flash fire pulse, the AND gate 202 switches to provide a logic 1 output signal level which is directed to respective input terminals of the AND gates 176 and 178.

If the subject were previously determined by the rangefinder circuit 22 to be located at infinity, then the AND gate 176 will be enabled by the logic 1 signal level previously applied to its input terminal α and will switch from a logic 0 output signal level to a logic 1 output signal level upon receipt of the logic 1 output signal level from the AND gate 202. The output signal from the AND gate 176 will be thereafter delayed for one second by a delay circuit 204 so as to provide a delayed logic 1 input signal level to an OR gate 206 (Block S). The OR gate 206, in turn, will switch to a logic 1 output signal level thereby providing a command signal to the motor and solenoid control circuit 116 to energize the solenoid 74 and terminate the exposure operation in a well-known manner (Block T).

However, in the event that sufficient scene light is detected by the photoresponsive element 54 and integrated by the integrator 186 to trigger the level detector LD2, prior to the expiration of the aforementioned 1 sec delay, then the exposure will be terminated prior to the 1 sec delay in the following manner (Block U). When the input voltage to the level detector LD2 reaches its threshold voltage, which by way of example may be 0.7 V, the level detector LD2 switches from a logic 0 output signal level to a logic 1 output signal level thereby providing a logic 1 input signal level to a terminal LD2 of an AND gate 214. The input terminal from OR gate 212 to the AND gate 214 is also at a logic 1 signal level by virtue of the AND gate 148 having switched to a logic 1 output signal level when the counter status 146 detected an empty counter 144. The AND gate 214 thus provides a logic 1 signal level to switch the OR gate 206 and provide the exposure terminating command signal, as a result of the triggering of the level detector LD2 prior to the expiration of the aforementioned 1 sec delay. Conversely, if the photographic subject is determined by the rangefinder circuit 32 to be located at a distance from the camera less than infinity, then the AND gate 178 will be enabled to provide a logic 1 output signal level immediately upon receipt of the logic 1 output signal level from the AND gate 202 at the termination of the 29 millisecond time delay. A logic 1 output signal level from the AND gate 178 immediately triggers the OR gate 206 to provide the aforementioned exposure terminating command signal to the motor and solenoid circuit 116 (Block V). Thus, under conditions of low ambient scene light intensity of less than 10 CD/ft$^2$, the shutter blade elements 36 and 38 are triggered to close 29 milliseconds subsequent to the initiation of the flash fire pulse when the photographic subject is located at distances of less than infinity from the camera and at one second subsequent to the termination of the flash fire pulse when the photographic subject is located at distances equal to infinity (greater than 30 ft) from the camera. Alternatively, the exposure may be terminated prior to the expiration of the one second timing delay if there is sufficient light to cause the light integrator 186 to trip at the level detector LD2.

Under conditions of high ambient scene light intensity greater than 10 Cd/ft$^2$, it can be seen that the brightness measurement circuit 166 provides a logic 1 signal level which enables the AND gate 168 to gate the 15 KHz clock pulse to the OR gate 164 while disabling the AND gate 170 from gating the 10 KHz clock pulse. Thus, the first light that is admitted to the photoresponsive element 54 from the LED 124 operates to trigger the level detector LD1 in the aforementioned manner thereby providing a logic 1 signal level to the input of the AND gate 168 so as to initiate the countdown by the counter 144 in synchronization with the initiation of the film exposure (Block P). In this manner, there is provided a range responsive timed signal commencing in correspondence with the initiation of the exposure interval and terminating at a subsequent time corresponding to the distance between the camera and the subject to be photographed.

In the event that the photographic subject is located close enough to the camera that the counter 144 counts down to empty prior to the output signal from the integrator circuit 186 triggering the level detector LD2, there will occur a change in the output from the counterstatus circuit 146 from a logic 0 signal level to a logic 1 signal level as previously discussed. The logic 1 output signal level from the counter status circuit 146 switches the output from the AND gate 148 to a logic 1 output signal level which, in turn, disables the counter 144 in the aforementioned manner.

The output from the AND gate 148, in turn, switches the output from the OR gate 196 to a logic 1 output signal level thereby actuating the flash fire pulse circuit 198 to provide the flash fire pulse to the strobe 112 (Block W). At the same instant that the strobe 112 is fired, there is also actuated a hold pulse circuit 216 which provides a one millisecond holding pulse to the sample and hold circuit 188 by way of an inverter 217.

As previously discussed, prior to the receipt of the holding pulse from the hold pulse circuit 216, the sample and hold circuit 188 operates to sample the output voltage from the light responsive element 54 and to transfer the sampled output voltage directly to the integrator circuit 186. The inverted logic 0 output signal level from the inverter 217 operates to change the mode of the sample and hold circuit 188 from one of sampling to one of holding. Thus, the sampled voltage from the scene light responsive element 54 at the instant prior to the output of the inverter 217 changing from a logic 1 signal level to a logic 0 signal level is held for the one millisecond duration of the holding pulse. The integrator 186 continues to receive the voltage held by the sample and hold circuit 188 regardless of the actual change in voltage from the scene light responsive element 54, and in this manner discounts the artificial illumination provided by the strobe 112. The one millisecond duration of the holding pulse is chosen to be slightly less than the duration of the light pulse from the strobe 112.

Subsequent to the expiration of the one millisecond hold pulse from the hold pulse circuit 216, scene light integration continues and ultimately triggers the level detector LD2 to provide a logic 1 output signal level to the terminal LD2 of the AND gate 214. The logic 1 input signal level to the other input terminal of the AND gate 214 is derived from the OR gate 212 which was previously gated to provide a logic 1 signal from AND gate 148 when the counter 144 emptied. Thus, the AND gate 214 provides a logic 1 output signal level to the OR gate 206 which in turn provides a logic 1 output signal level to command the motor and solenoid control circuit 116 to energize the solenoid 74 and thereby terminate the exposure interval (Block X).

In this manner, means are provided for discounting the artificial illumination provided by the strobe 112 so that a select proportion of the optimum film exposure value is directly provided by ambient scene light while the remaining proportion of the optimum film exposure value is directly attributable to the artificial scene light provided by the strobe 112. In the illustrated embodiment 30 percent of the film exposure may be directly attributable to the artificial scene light provided by the strobe 112 while 70 percent of the film exposure may be directly attributable to the ambient scene light. These proportions are established, for example, by the 0.7 volt trigger level of the level detector LD2 and a 1.0 volt trigger level for another level detector LD3. In other words, level detector LD3 which may be triggered at 1 volt represents an optimum film exposure value so therefore by terminating the exposure interval upon the triggering of level detector LD2 at 0.7 volts subsequent to discounting the artificial illumination provided by the strobe 112 insures that at least 30 percent of the optimum film exposure will be provided by the artificial light from the strobe 112.

Also, it should be readily appreciated that by counting down at the faster clock rate of 15 KHz, there is provided a decrease in the duration of the range responsive timed signal by a constant factor (1.5) in response to a high ambient scene light intensity above 10 $Cd/ft^2$. The decrease in the duration of the range responsive timed signal effects the firing of the strobe 112 at a shorter time subsequent to the commencement of the exposure interval than the time at which the strobe 112 would otherwise be fired under conditions of low ambient scene light intensity of less than 10 $Cd/ft^2$. Whereas the opening speed for the shutter blade elements 36 and 38 is generally constant, it is readily apparent that the strobe 112 is fired sooner and at a smaller aperture during the high ambient scene light intensity mode of operation than during the aforementioned low ambient scene light intensity mode of operation. Preferably, the strobe 112 is fired at a determinate number of stops larger aperture during the high ambient scene light intensity mode of operation than it would be during the low ambient scene light intensity mode of operation for a subject located at the same distance from the camera.

Photographic subjects may be located at too great a distance from the camera to maintain the aforementioned proportion between ambient and artificial scene light, in which case there is provided a so-called transient mode of operation where the level detector LD2 will be triggered to provide a logic 1 output signal level prior to the counter 144 emptying. In this situation, the integrator circuit 186 will trigger the level detector LD2 to provide a logic 1 output signal level which in turn will trigger the OR gate 196 to provide a logic 1 output signal level, in turn, actuating the flash fire pulse circuit 198 to fire the strobe 112 in the aforementioned manner (Block Y). Simultaneous with the strobe 112 firing, the hold pulse circuit 216 will be actuated in the aforementioned manner to switch the sample and hold circuit 188 from its sampling to its holding mode thereby controlling the integrator 186 to discount the artificial illumination provided by the strobe 112.

In the event that the photographic subject is located close enough to the camera that the counter 144 empties prior to the scene light integrator triggering the level detector LD3, there will be provided a logic 1 input signal level to the OR gate 212 which operates in conjunction with the logic 1 output signal level from the level detector LD2 to switch the AND gate 214 to a logic 1 output signal level in turn, switching the OR gate 206 to provide the exposure terminating command signal to the motor and solenoid control circuit 116 (Block $Z_1$).

Conversely, if the photographic subject is located at such a great distance from the camera that the level detector LD3 will be triggered by the output signal from the integrator 186 prior to the counter 144 emptying, then there will be provided a logic 1 output signal level to the OR gate 212 which, in turn, will provide a logic 1 input signal level to the AND gate 214 which, in turn, will trigger to provide a logic 1 input signal level to the OR gate 206 thereby providing the exposure terminating command signal to the motor and solenoid control circuit 116 (Block $Z_2$). As should be readily apparent, during this transient mode of operation, the proportion of the film exposure value directly attributable to the artificial scene light provided by the strobe 112 decreases from the aforementioned 30 percent in direct correspondence with the increase in the subject-to-camera distance range until the artificial scene light provides no contribution to the film exposure which is the situation when the level detector LD3 switches to provide the exposure terminating command signal prior to the counter 144 emptying.

Other embodiments of the invention, including additions, subtractions, deletions and other modifications of the preferred disclosed embodiments of the invention will be obvious to those skilled in the art and are within the scope of the following claims. For instance, the objective lens arrangement 12 herein described may alternatively be a lens disc comprising a plurality of circumferentially spaced apart lens elements with the lens disc being actuated upon initial movement of the walking beam in a manner as is more fully described in U.S. patent application Ser. No. 919,084, supra.

What is claimed is:

1. A camera including a system for controlling the energization of a source of artificial illumination during a photographic exposure interval occurring under conditions of substantial ambient scene light intensity, said camera comprising:
   means for defining a film exposure plane;
   means for automatically controlling a photographic exposure interval, said control means comprising a shutter blade mechanism operable to provide progressively increasing aperture values during an exposure interval and means for detecting and integrating scene light in correspondence with the scene light admitted by said blade mechanism to said film exposure plane during the photographic exposure interval and for automatically closing said shutter blade mechanism upon the detection and integration of a quantity of admitted scene light corresponding to a select proportion of the optimum film exposure value;
   means for providing a range responsive timed signal commencing in correspondence with the initiation of said exposure interval and terminating at a subsequent time corresponding to the distance between said camera and a subject to be photographed;
   means responsive to the termination of said range responsive timed signal for providing an output signal to initiate the energization of the source of artificial illumination; and
   means responsive to said output signal of said last stated means for controlling said scene light detecting and integrating means to discount the artificial illumination provided by the source of artificial illumination such that said select proportion of the optimum film exposure value is directly attributable to ambient scene light while the remaining proportion of the optimum film exposure value is directly attributable to artificial scene light provided by the source of artificial illumination.

2. The camera of claim 1 wherein said means for controlling said scene light detecting and integrating means includes means for blanking said scene light detecting and integrating means for a period of time substantially corresponding to the period of time during which said source of artificial illumination is energized.

3. The camera of claim 2 wherein said blanking means operates to first sample the output from the scene light detecting portion of said scene light detecting and integrating means and to thereafter maintain the output from said scene light detecting portion of said scene light detecting and integrating means at the sampled value for the duration of said blanked time period.

4. The camera of claim 1 wherein said means for controlling said scene light detecting and integrating means further includes means responsive to the detection and integration of a quantity of admitted scene light corresponding to said select proportion of the optimum film exposure value prior to the termination of said range responsive timed signal for providing said output signal to initiate the energization of the source of artificial illumination while simultaneously disabling said means for automatically closing said shutter blade mechanism upon the detection and integration of a quantity of admitted scene light corresponding to said select proportion of the optimum of film exposure value.

5. The camera of claim 4 wherein said means for controlling said scene light detecting and integrating means further includes means responsive, subsequent to the energization of the source of artificial illumination, to the termination of said range responsive timed signal prior to the detection and integration of a quantity of admitted scene light corresponding to the optimum film exposure value for enabling said means to automatically close said shutter blade mechanism.

6. The camera of claim 5 wherein said enabling means also operates to enable said shutter blade closing means to automatically close said shutter blade mechanism in response to the detection and integration of a quantity of admitted scene light corresponding to the optimum film exposure value prior to the termination of said range responsive timed signal.

7. The camera of claim 1 wherein said means for providing said range responsive timed signal commencing in correspondence with the initiation of said exposure interval includes means for providing an artificial light prior to said exposure interval and for detecting the artificial light at the instant said blade mechanism is moved to initiate said exposure interval.

8. The camera of claim 7 wherein said last state means for providing an artificial light comprises a light emitting diode.

9. A camera including a system for controlling the energization of a source of artificial illumination during a photographic exposure interval occurring under conditions of either insignificant ambient scene light intensity or substantial ambient scene light intensity, said camera comprising:

means for defining a film exposure plane;
means for detecting scene light prior to the commencement of the photographic exposure interval and for providing one select output signal condition responsive to the intensity of detected scene light being above a determinate level and another select output signal condition responsive to the intensity of detected scene light being below said determinate level;

means for automatically controlling a photographic exposure interval, said control means comprising a shutter blade mechanism operable to provide progressively increasing aperture values during an exposure interval and means for detecting and integrating scene light in correspondence with the scene light admitted by said blade mechanism to said film exposure plane at least during an exposure interval subsequent to the provision of said one select output signal condition in response to the detection of scene light being above said determinate level and for automatically closing said shutter blade mechanism to terminate the exposure interval;

means for providing a range responsive timed signal commencing in correspondence with the initiation of said exposure interval and terminating at a subsequent time corresponding to the distance between said camera and a subject to be photographed in response to said one select output signal condition, said timed signal providing means also operating to change the duration of said timed signal by a constant factor in response to said other select output signal condition; and means responsive to the termination of said range responsive timed signal for providing an output signal to initiate the energization of the source of artificial illumination.

10. The camera of claim 9 wherein said means for automatically controlling a photographic exposure interval operates in response to the provision of said one select output signal condition upon the detection of scene light above said determinate level to automatically close said shutter blade mechanism upon the detection and integration of a quantity of admitted scene light corresponding to a select proportion of the optimum film exposure source, said camera further including means responsive to said output signal for energizing said illumination source subsequent to the provision of said one select output signal condition upon the detection of scene light above said determinate level, for controlling said scene light detecting and integrating means to discount the artificial illumination provided by the source of artificial illumination such that said select proportion of the optimum film exposure value is directly attributable to ambient scene light while the remaining proportion of the optimum film exposure value is directly attributable to artificial scene light provided by the source of artificial illumination.

11. The camera of claim 10 wherein said means for controlling said scene light detecting and integrating means includes means for blanking said scene light detecting and integrating means for a period of time substantially corresponding to the period of time during which said source of artificial illumination is energized.

12. The camera of claim 11 wherein said blanking means operates to first sample the output from the scene light detecting portion of said scene light detecting and integrating means and to thereafter maintain the output from said scene light detecting portion of said scene light detecting and integrating means at the sampled value for the duration of said blanked time period.

13. The camera of claim 10 wherein said means for controlling said scene light detecting and integrating means further includes means responsive to the detection and integration of a quantity of admitted scene light corresponding to said select proportion of the optimum film exposure value subsequent to the provision of said one select output signal condition and prior to the termination of said range responsive timed signal for providing said output signal to initiate the energization of the source of artificial illumination while simultaneously disabling said means for automatically closing said shutter blade mechanism upon the detection and integration of a quantity of admitted scene light corresponding to said select proportion of the optimum of film exposure value.

14. The camera of claim 13 wherein said means for controlling said scene light detecting and integrating means further includes means responsive, subsequent to the provision of said one select output signal condition and the energization of the source of artificial illumination, to the termination of said range responsive timed signal prior to the detection and integration of a quantity of admitted scene light corresponding to the optimum film exposure value for enabling said means to automatically close said shutter blade mechanism.

15. The camera of claim 14 wherein said enabling means also operated to enable said shutter blade closing means to automatically close said shutter blade mechanism in response to the detection and integration of a quantity of admitted scene light corresponding to the optimum film exposure value prior to the termination of said range responsive timed signal.

16. The camera of claim 9 wherein said means for providing said range responsive timed signal commencing in correspondence with the initiation of said exposure interval includes means for providing an artificial light prior to said exposure interval and for detecting the artificial light at the instant said blade mechanism is moved to initiate said exposure interval.

17. The camera of claim 16 wherein said last stated means for providing an artificial light comprises a light emitting diode.

18. In a camera adapted to be energized at least in part by a source of electrical energy and including a manually actuable member, means for defining a film plane, means responsive to the operation of said manually actuable member for defining an exposure interval during which image forming light rays from a subject are directed onto said film plane, means for determining camera-to-subject distance for different exposure operations of said camera and means responsive to the operation of said manually actuable member for firing a source of artificial illumination from the source of electrical energy, under conditions of both insignificant and substantial ambient light, at a selected period of time following the commencement of each said exposure interval, said selected period of time varying between exposure operations of said camera as a function of variations in said subject distances between said exposure operations, the improvement comprising means for indicating whether the ambient light condition associated with each exposure operation is above or below a predetermined level and wherein said means for firing the source of artificial illumination further includes means responsive to said ambient light condition indicating means for varying said selected period of time by a predetermined factor dependent upon whether the ambient light condition during a particular exposure operation is above said predetermined level.

19. The camera of claim 18 wherein the means for defining an exposure interval includes a shutter blade mechanism operable to provide progressively increasing aperture values during an exposure interval such that variations in said selected period of time result in corresponding variations in the aperture value at which the source of artificial illumination is energized.

20. The camera of claim 19 wherein said means for varying said selected period of time operates to reduce said selected period of time when the ambient light condition during a particular exposure operation is above said predetermined level.

21. The camera of claim 20 wherein said means for varying said selected period of time operates to reduce said selected period of time by a predetermined constant factor of 1.5.

22. The camera of claim 19 wherein each of said selected periods of time corresponds to a particular camera to subject distance and commences in correspondence with the initiation of each said exposure operation, and said firing means further includes means for providing an artificial light prior to each said exposure operation and means for detecting such artificial light at the instant said blade mechanism is moved to initiate each said exposure operation.

23. In a camera adapted to be energized at least in part by a source of electrical energy and including means for defining a film plane and means for mounting a source of artificial illumination adapted to be fired from the source of electrical energy under conditions of substantial ambient light, the improvement comprising means for providing substantially the same proportions of ambient and artificial light from the subject for different exposure operations of said camera in which the camera-to-subject distances vary over a significant range of camera-to-subject distances, said ambient light from the subject constituting a substantial amount, but less than the total amount, of the light from the subject provided at said exposure plane in each such exposure operation of said camera.

24. The camera of claim 23 wherein said significant range of camera-to-subject distances over which said same proportions of ambient and artificial light can be provided to said exposure plane varies in correspondence with variations in the level of the substantial ambient light.

25. The camera of claim 23 wherein said means for providing substantially the same proportions of said ambient and artificial light include: means for determining camera-to-subject distance for different exposure operations of said camera; means for firing the source of artificial illumination from the source of electrical energy at a selected period of time following the commencement of each said exposure interval, said selected period of time varying between exposure operations of said camera as a function of variations in said subject distances between said exposure operations; and means for detecting and integrating the light from the subject in correspondence with the light admitted to said film plane during each exposure operation of said camera until the source of artificial illumination is fired and for thereafter blanking said light detecting and integrating means for a period of time substantially corresponding to the period of time during which the source of artificial illumination is fired and for thereafter resuming the detection and integration of light until reaching a value corresponding to said same proportion of ambient light so as to terminate said exposure operation.

26. The camera of claim 25 including means responsive to said detecting and integrating means reaching said value corresponding to said same proportion of ambient light prior to the expiration of said selected period of time following the commencement of said exposure operation for firing said source of artificial illumination, said detecting and integrating means thereafter operating to blank said light detecting and integrating means for a period of time substantially corresponding to the period of time during which the source of artificial illumination is fired and for thereafter resuming the detection and integration of light until either the expiration of said selected period of time or until reaching a value corresponding to the total amount of light from the subject to be provided at said exposure plane.

27. The camera of claim 25 wherein said same proportion of ambient light provided at said exposure plane is 70% of the total amount of the light from the subject provided at said exposure plane in each source of exposure operation of said camera.

28. The camera of claim 23 including a manually actuable member wherein the means for providing substantially the same proportions of ambient and artificial light from the subject includes: a shutter blade mechanism operable to provide progressively increasing aperture values during an exposure interval; means for determining camera-to-subject distance for different exposure operations of said camera; and means responsive to the operation of said manually actuable member for firing the source of artificial illumination from the source of electrical energy at a selected period of time following the commencement of each said exposure interval wherein said selected period of time varies between exposure operations of said camera as a function of variations in said subject distances between said exposure operations.

29. The camera of claim 28 wherein each of said selected periods of time corresponds to a particular camera to subject distance and commences in correspondence with the initiation of each said exposure operation, and said firing means further includes means for providing an artificial light prior to each said exposure operation and means for detecting such artificial light at the instant said blade mechanism is moved to initiate each said exposure operation.

30. The camera of claim 28 including means for indicating whether the ambient light condition associated with each exposure operation is above or below a predetermined level and wherein said means for firing the source of artificial illumination further includes means responsive to said ambient light condition indicating means for varying said selected period of time be a predetermined factor dependent upon whether the ambient light condition during a particular exposure operation is above said predetermined level.

31. In a camera adapted to be energized at least in part by a source of electrical energy and including means for defining a film plane and means for mounting a source of artificial illumination adapted to be fired from the source of electrical energy under conditions of substantial ambient light, the improvement comprising means for automatically providing at said film plane, in different exposure operations of said camera involving substantially the same scene but in which a given subject within the scene and within the effective distance range of said source of artificial illumination varies in distance from said camera, substantially the same amount of ambient light from the scene and the same amount of artificial light from the subject, said ambient light constituting a substantial amount, but less than the total amount, of light provided at said film plane in each such exposure operation of said camera.

32. The improvement of claim 31 wherein said means for providing substantially the same amounts of ambient and artificial light include: means for determining camera-to-subject distance for different exposure operations of said camera; means for firing the source of artificial illumination from the source of electrical energy at a selected period of time following the commencement of each said exposure interval, said selected period of time varying between exposure operations of said camera as a function of variations in said subject distances between said exposure operations; and means for detecting and integrating the light from the subject in correspondence with the light admitted to the film plane during each exposure operation of said camera until the source of artificial illumination is fired and for thereafter blanking said light detecting and integrating means for a period of time substantially corresponding to the period of time during which the source of artificial illumination is fired and for thereafter resuming the detection and integration of light until reaching a value corresponding to said amount of ambient light so as to terminate said exposure operation.

33. The improvement of claim 32 including means responsive to said detecting and integrating means reaching said value corresponding to said same amount of ambient light prior to the expiration of said selected period of time following the commencement of said exposure operation for firing said source of artificial illumination, said detecting and integrating means thereafter operating to blank said light detecting and integrating means for a period of time substantially corresponding to the period of time during which the source of artificial illumination is fired and for thereafter resuming the detection and integration of light until either the expiration of said selected period of time or until reaching a value corresponding to the total amount of light to be provided at said film plane.

34. The improvement of claim 32 wherein said amount of ambient light provided at said film plane is 70% of the total amount of the light provided at said film plane in each exposure operation of said camera.

35. The camera of claim 31 including a manually actuable member wherein the means for providing substantially the same amounts of ambient and artificial light includes: a shutter blade mechanims operable to provide progressively increasing aperture values during an exposure interval; means for determining camera-to-subject distance for different exposure operations of said camera; and means responsive to the operation of said manually actuable member for firing the source of artificial illumination from the source of electrical energy at a selected period of time following the commencement of each said exposure interval wherein said selected period of time varies between exposure operations of said camera as a function of variations in said subject distances between said exposure operations.

36. A method of exposing photographic film to selected proportions of ambient and artificial light to provide a determinate exposure value comprising the steps of:
  admitting ambient light to the photographic film for a period of time to define an exposure interval,
  energizing a source of artificial light to provide a pulse of light energy during said exposure interval so as to expose the photographic film to said select proportion of artificial light,
  detecting solely ambient light admitted to the photographic film until reaching a select value corresponding to said selected proportion of ambient light; and terminating the exposure interval responsive to the detection of said select value.

37. The method of claim 36 for exposing a photographic subject on the film by way of an objective lens wherein the lens to subject distance for any one exposure interval may be any one of a determinate range of lens to subject distances comprising the further steps of:

admitting ambient light to the photographic film from the objective lens by way of an aperture; and varying the size of said aperture such that the size of said aperture corresponds to the particular lens to subject distance during the pulse of light energy.

* * * * *